Sept. 5, 1967
J. R. RANZ
3,339,831
BLOWER
Filed Oct. 11, 1965
4 Sheets-Sheet 1
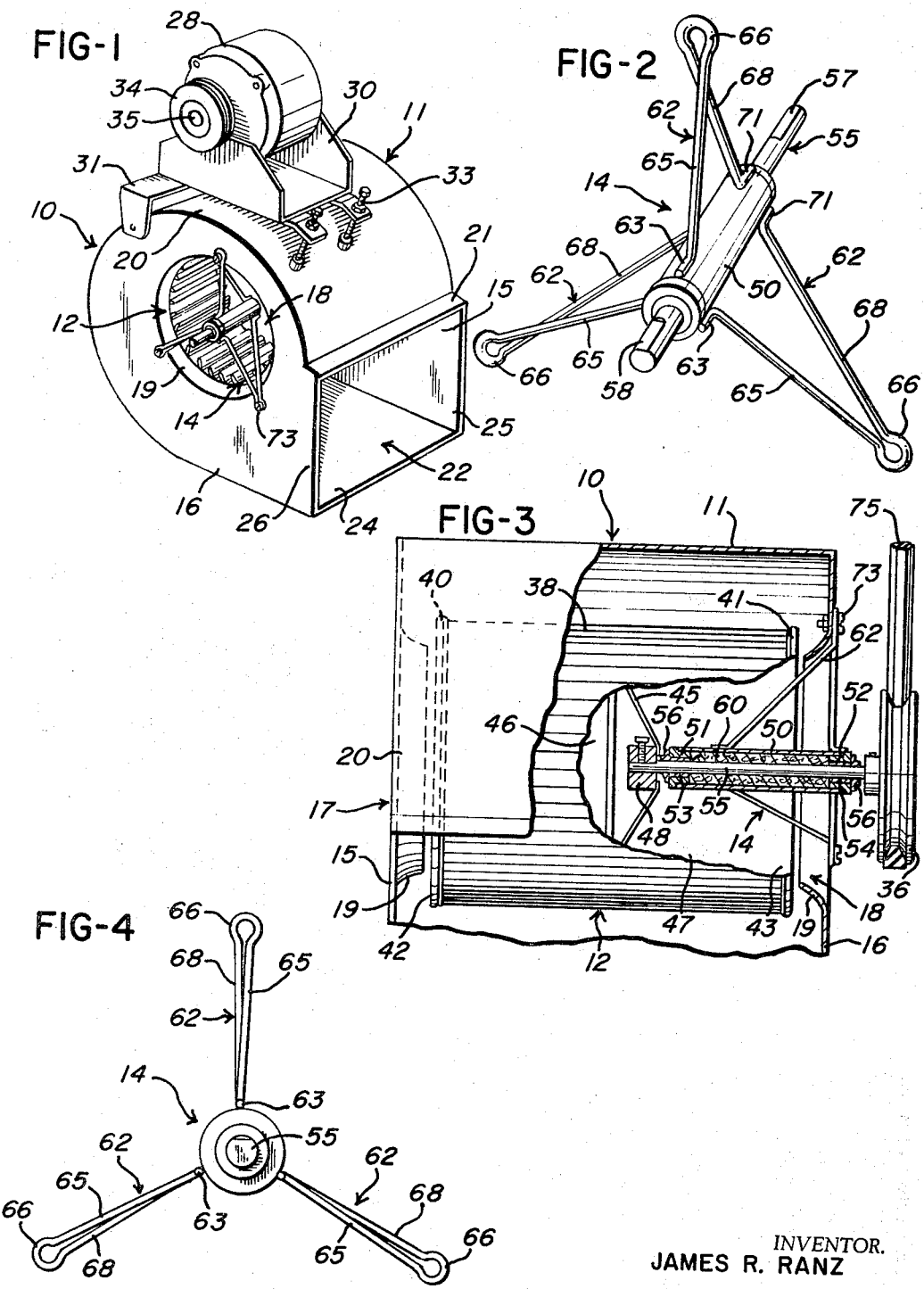
INVENTOR.
JAMES R. RANZ
BY
Maréchal, Biebel, French & Bugg
ATTORNEYS

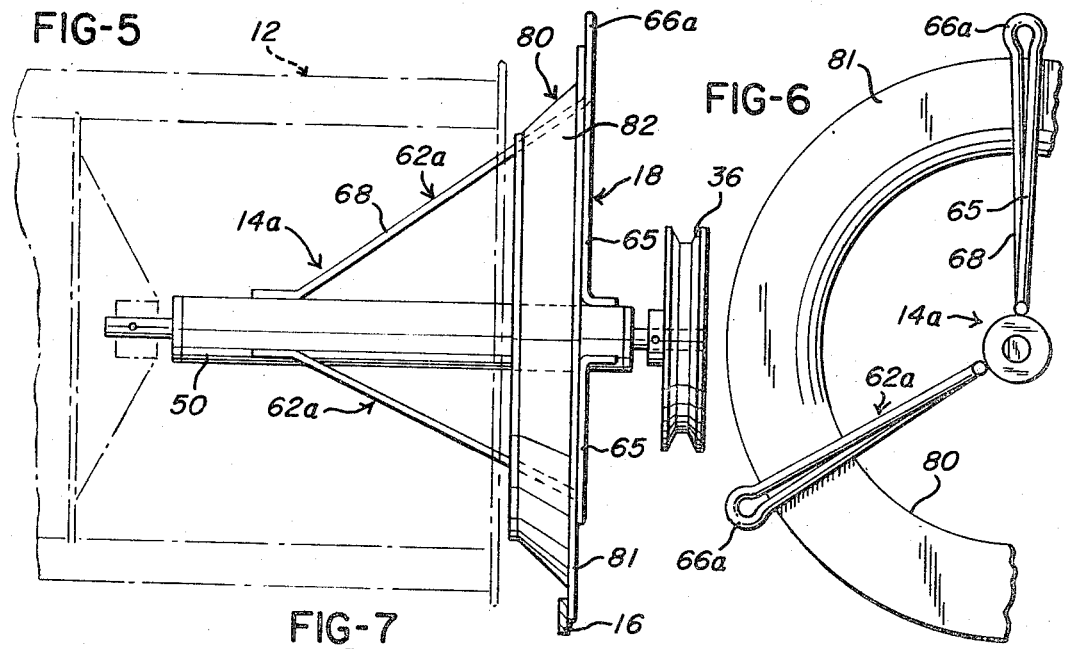
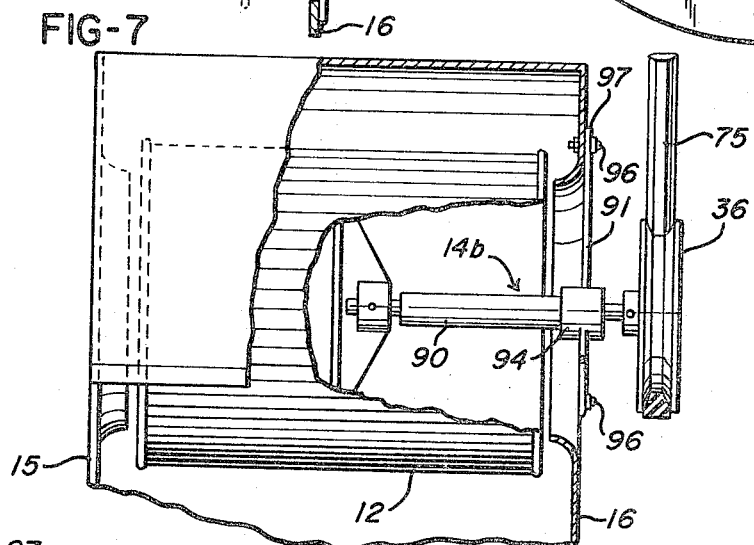
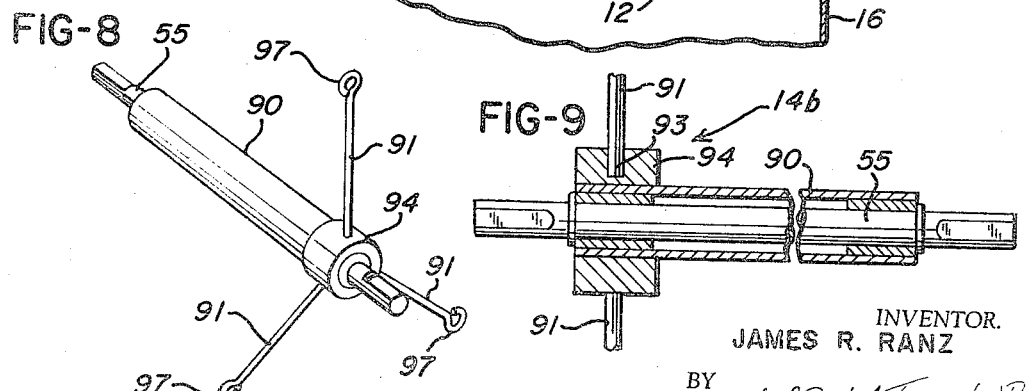

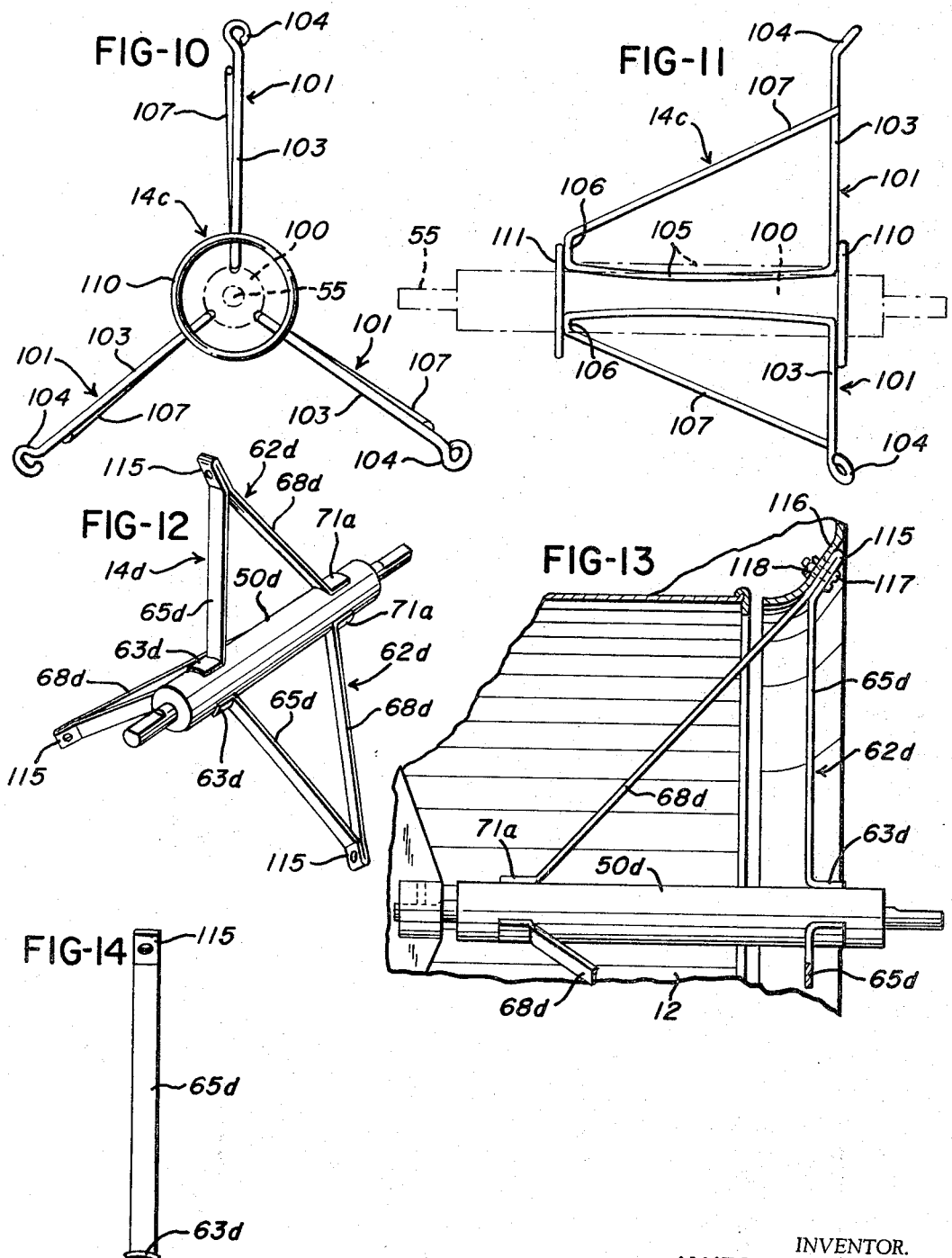

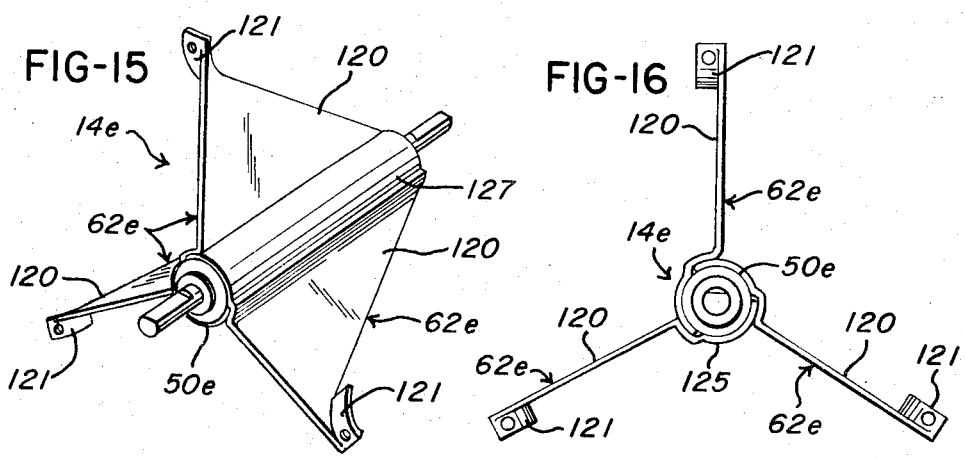
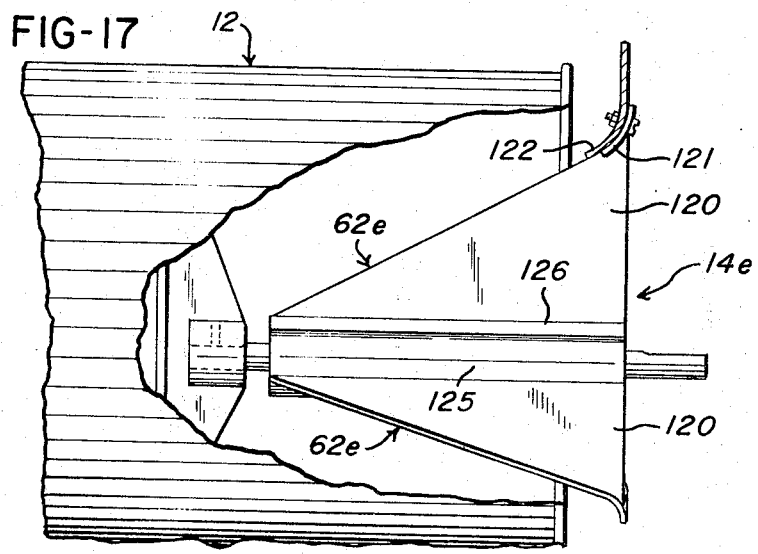

United States Patent Office 3,339,831
Patented Sept. 5, 1967

3,339,831
BLOWER
James R. Ranz, Dayton, Ohio, assignor to The Lau Blower Company, Dayton, Ohio, a corporation of Ohio
Filed Oct. 11, 1965, Ser. No. 494,667
8 Claims. (Cl. 230—128)

ABSTRACT OF THE DISCLOSURE

A cantilever support for mounting a double inlet centrifugal blower wheel within a volute housing. The cantilever support is mounted on the housing adjacent one of the inlets and includes a plurality of brackets which support an elongated sleeve at both its inner and outer ends. A drive shaft is journaled in the sleeve for rotating the blower wheel through a pulley or the like on the outer end of the sleeve. A venturi ring may be provided adjacent the brackets to define a smooth inlet into the blower wheel without requiring a deforming step on the side wall of the housing.

This invention relates to blowers and more particularly to a centrifugal blower and the drive therefor.

Centrifugal blowers are frequently used in hot air heating systems, ventilating systems and the like and embody a centrifugal blower wheel mounted for high speed rotation in a volute shaped housing. The double inlet blower wheel allows air to be drawn into the housing from opposite sides, and this blower wheel may be supported and driven by electric motors mounted directly in one of the inlets to the blower wheel, for example, as disclosed in United States patent to Burrowes No. 2,686,630, issued Aug. 17, 1954.

However, in many installations it is not feasible or desirable to mount the drive motor to the inlet, and accordingly this motor is mounted on the outside of the housing or the housing support and drives the blower wheel through a pulley and belt arrangement. In such blowers, the double inlet blower wheel is supported within the housing by a shaft which extends axially through the inlets on opposite sides of the blower housing and is supported by bearings secured adjacent the sides of the housing by suitable brackets. The present invention is directed to improvements in the supports for the blower wheels.

Accordingly, an important object of this invention is to provide a blower wheel support which can be assembled into the blower assembly much more quickly than the prior art, and further to provide such a support which is less expensive and supported solely on one side wall of the blower housing.

Another object of the invention is to provide a cantilevered support for a double inlet centrifugal blower wheel which presents a minimum of restriction to the flow of air into the blower wheel, and further to provide such a blower wheel support which is easily fabricated from light weight metal components and which utilizes a support shaft which is substantially shorter and smaller in diameter than that used in the prior art devices.

A further object of this invention is to provide an improved blower assembly wherein the blower wheel support has the venturi of the blower inlet secured thereto so that the venturi, wheel, shaft, pulley and bearings can be preassembled and prebalanced prior to mounting the subassembly in the blower housing, and further to provide a cantilever blower wheel support of the aforesaid type which can be easily and quickly fabricated from wire, sheet metal strips, or sheet metal pieces.

Other objects and advantages of the invention will be apparent from the following description, the accompanying drawings and the appended claims.

In the drawings:

FIG. 1 is a perspective view of a blower assembly in accordance with the invention;

FIG. 2 is another perspective view showing one embodiment of the cantilevered blower wheel support;

FIG. 3 is a sectional view taken centrally through the blower shown in FIG. 1;

FIG. 4 is an end view of the blower wheel support shown in FIG. 2;

FIG. 5 is an elevation view of another embodiment of the invention;

FIG. 6 is an end view of the embodiment shown in FIG. 5;

FIG. 7 is an elevation view partially broken away and illustrating another embodiment of the invention;

FIG. 8 is a perspective view of the blower wheel support shown in FIG. 7;

FIG. 9 is a sectional view taken centrally through the support shown in FIG. 8;

FIG. 10 is an end view of still another embodiment of the invention;

FIG. 11 is an elevation view of the support shown in FIG. 10;

FIG. 12 is a perspective view of a further embodiment of the invention;

FIG. 13 is a fragmentary elevation view showing the manner in which the support of FIG. 12 is secured in a blower housing;

FIG. 14 is an elevation view of one of the brackets of the embodiment shown in FIG. 12;

FIG. 15 is a perspective view of another embodiment of the invention;

FIG. 16 is an end view of the support shown in FIG. 15; and

FIG. 17 is an elevation view partially in section showing the manner in which the support of FIG. 15 is secured in a blower housing.

Referring to the drawings wherein preferred embodiments are disclosed, FIGS. 1 and 3 show a blower assembly 10 which includes a volute shaped housing 11 having a double inlet centrifugal blower wheel 12 mounted therein by the cantilever support 14. The blower housing 11 includes the side walls 15 and 16 each of which has an inlet opening 17 and 18 therein, and the smoothly rounded venturi 19 is formed in the walls 15 and 16 around the openings 17 and 18 to facilitate the flow of air into the blower wheel. A back wall 20 interconnects the side walls 15 and 16 and extends in a spiral path from the upper wall 21 of the outlet duct 22, around the blower wheel 12 and terminates in the bottom wall 24 of the duct 22. The portions 25 and 26 of the side walls 15 and 16 form the sides of the outlet duct 22 which is adapted to be connected to the system in which the blower assembly is to be used.

The drive motor 28 for the blower wheel 12 is mounted on top of the housing 11 by the U-shaped bracket 30 which is pivotally secured to the housing by the hinge member 31. The forward portion of the mounting bracket 30 can be raised or lowered by the adjusting screws 33 to vary the distance between the pulley 34 on the motor drive shaft 35 and the pulley 36 on the cantilever support 14.

As seen in FIG. 3, the double inlet blower wheel includes a plurality of parallel air moving blades 38 which extend between the end rings 40 and 41 at the opposite ends of the blower wheel 12. These end rings secure the ends of the individual blades 38 together and define the air inlets 42 and 43 to the blower wheel 12 which are aligned with the inlet openings 17 and 18. A support partition or center disk assembly 45 is mounted centrally within the blower wheel and secured to the blades 38 for interconnecting the blades 38 and the hub 48 which is utilized to mount the blower wheel 12 for rotation in position in a conventional manner. The support partition 45 may or may not have air openings therein, and it should be understood that numerous types and designs of center supports and double inlet blower wheels may be used without departing from the scope of this invention.

As indicated above, the important feature of the invention relates to the cantilever support 14 for the blower wheel 12, and this support includes a tubular support sleeve 50 which has the resilient bearing retainers 51 and 52 press fitted into the opposite ends thereof, as seen in FIG. 3. The retainers have the bearings 53 and 54 secured internally thereof for supporting the elongated drive shaft 55 which is held against axial movement with respect to the sleeve 50 by the thrust members 56. The shaft 55 may have the flattened surfaces 57 and 58 on the opposite ends thereof adapted to be received on the hub 48 of the blower wheel 12 and the drive pulley 36, respectively. The interior of the sleeve 50 between the retainers 51 and 52 and the bearings 53 and 54 may be filled with a suitable packing material 60 for use in lubricating the shaft 55 and bearings 53 and 54 as required for frictionless operation thereof.

The sleeve 50 is supported in the inlet opening 18 by three wire brackets 62 which rigidly support the sleeve 50, the shaft 55, and the blower wheel 12 within the housing 11. Each of the wire brackets 62 has a base portion 63 which is secured near the right-hand end of the sleeve 50 by brazing or welding, and the base has integrally connected thereto a straight portion 65 which extends substantially perpendicularly of the sleeve 50 and the shaft 55 to a portion beyond the outer diameter of the inlet opening 18 in the side wall 16 of the housing 11. The wire is then formed into a circular loop 66 which has a sloped portion 68 extending to the intermediate portion of the sleeve 50 where the integral base portion 71 is brazed to the sleeve 50. Each of the loops 66 receives a bolt 73 to secure the brackets 62 to the side wall 16 of the housing 11, as shown in FIGS. 1 and 3.

Each of the brackets 62 is identical, and they are spaced 120° apart for securing the sleeve 50 and the support shaft 55 within the inlet opening 18 of the blower housing 11. However, the invention is not limited to the use of three such brackets and it is possible to use two, four, five, or substantially any number without departing from the scope of the invention.

In operation, the pulley 36 is mounted on the right-hand end of the shaft 55, and a V-belt 75 is used to interconnect the motor drive pulley 34 with the pulley 36 so that the motor 28 rotates the blower wheel 12 at high speed. This action causes air to be drawn into the blower wheel 12 through the inlet openings 17 and 18 and forced from the chambers 46 and 47 between the blades 38 of the blower wheel 12 and through the outlet duct 22. There is no obstruction to air flow through the inlet opening 17 while there is only a very small resistance through the opposite inlet opening 18 thereby providing for increased efficiency.

This cantilever support arrangement permits the blower wheel 12 to be easily secured in place since access is required from one side only and since the cantilever support 14 is formed as a single unit for easy installation and removal. Should the support 14 require replacement, it is a simple procedure to detach the bolts 73 and replace the support 14 with another cantilever support.

Another embodiment of the cantilever support 14a is shown in FIGS. 5 and 6 wherein the components which are identical to that described above are given similar reference characters. The basic difference in this embodiment is that the venturi 80 which defines the inlet opening 18 in the blower housing is formed as a part of the cantilever support 14a. Accordingly, the venturi 80 include a flat vertical section 81 which is brazed or otherwise suitably secured to the straight portion 65 of each of the brackets 62a, and the venturi portion 82 extends radially and axially inward. The loops 66a extend radially outward of the sleeve 50 a greater distance although they are secured to the housing in the manner described above. This embodiment allows the side wall 16 of the blower to be formed from a flat piece of sheet metal without any deforming operations being required to form the venturi 80. By securing the brackets 66a in place on the side wall 16 of the housing, the flat section 81 of the venturi 80 overlaps the housing around the periphery of opening 18 and thus the venturi 80 and cantilever support 14a are mounted in position simultaneously.

Another embodiment of the cantilever support 14b is shown in FIGS. 7–9 wherein similar components of the invention are also given similar reference characters. In this embodiment the sleeve 90 is supported by three straight wire brackets 91 which are disposed substantially entirely in the plane of the blower side wall 16. The inner ends 93 of the brackets 91 are secured to a stabilizing ring 94 provided around the sleeve 90 at the right-hand end thereof. When the bolts 96 are inserted through the loops 97 in the outer ends of the brackets 91, the cantilever support 14b is locked in place and the shaft 55 is positioned for supporting and rotation of the blower wheel 12. When the support 14b is properly mounted in place the brackets 91 are tensioned so that the ring 94 and the sleeve 90 are held against movement in any direction for support of the drive shaft 55 and blower wheel 12.

Another embodiment of the invention is shown in FIGS. 10 and 11 wherein the cantilever support 14c includes a sleeve 100 which can be removed from the support brackets 101. In particular, each of these support brackets includes a straight portion 103 having a loop 104 on the end thereof adapted to be secured in the venturi 19 of the blower housing 11. An inwardly bowed resilient portion 105 extends along the length of the sleeve 100 from the inner end of straight portion 103 and terminates in a flat portion 106 provided at the opposite end of the bowed portion 105. The sloped portion 107 extends from the flat portion 106 to the outer end of the straight portion 103 where its end is secured to the straight portion 103. The brackets 101 are secured together by the annular washer rings 110 and 111 which are welded to the flat portions 106 and the straight portions 103 to form an integral bracket assembly. The sleeve 100 is then forced between the bowed portions 105 by inserting it through one of the rings 110 or 111 so that the bowed portion 105 frictionally engages the tube 100 to hold it, the tube 100, shaft 55, and blower wheel 12 in position. Advantages of this embodiment are its adaptability to different sleeve and shaft lengths for blowers of different widths and its ability to be easily assembled and disassembled for shipping and reduced costs.

The embodiment of the cantilever support 14d shown in FIGS. 12–14 is substantially identical to that shown and described in FIGS. 1–4 except that the brackets 62d are made of strips of sheet metal rather than wire. Thus each of the brackets 62d includes the base portion 63d secured to the sleeve 50d, the straight portion 65d extending radially of the sleeve and having flattened overlap sections 115 having the opening therein and which is secured in the venturi 116 (FIG. 13) by the bolt and nut 117 and 118. The sloped portion 68d extends from the overlapped section 115 to another base portion 71a which is rigidly secured to the sleeve 50d. The advantages of this embodiment are similar to those described above in connection with FIGS. 2-4 wherein a rigid inexpensive support is provided for the blower wheel.

Similarly, the embodiment of the cantilever support 14e shown in FIGS. 15-17 is similar to that shown in FIGS. 1-4 except that the sheet metal brackets 62e are utilized. Specifically, each of the brackets 62e is made of a triangular shaped sheet metal section 129 which has an outer configuration similar to that defined by the bracket 62. Each of the brackets 62e also extends radially outward from the sleeve 50e and has a deformed portion 121 on the outermost portion thereof adapted to conform to the venturi 122 or the housing adjacent the venturi for securing the brackets 62e in place by use of the nut and bolt. Each of the triangular sheet metal brackets 62a has an arcuate portion 125 along the lower edge 126 thereof which overlap one another (FIG. 16) and form a tube 127 when secured together for surrounding the sleeve 50e. The overlapped portions 125 are suitably brazed or otherwise secured together and to the sleeve 60e so that a cantilever support 14e of increased strength and rigidity and having substantially all of the advantages described above is provided.

The invention has thus provided a cantilever support for a double inlet blower wheel, although it is within the scope of this invention to use the support for a single inlet blower wheel. The cantilever supports use a shortened support shaft and the brackets can be fabricated from wire, metal strips, or sheet metal all of which provide an inexpensive assembly which offers comparatively little obstruction to air flow.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A blower assembly comprising, a double inlet blower wheel having a partition therein for use in supporting the wheel, means defining an inlet in each end of said blower wheel, a housing for said blower wheel having an inlet opening aligned with each inlet of said blower wheel, an elongated relatively small diameter tubular sleeve extending axially through one of said inlet openings and through the adjacent one of said inlets of said blower wheel to a position adjacent said partition, said sleeve being supported in cantilevered manner by a plurality of spaced brackets, each said bracket including a straight portion which extends radially outward generally in the plane of said one inlet opening from a rigid connection with said sleeve to an outer end portion on the periphery of said one inlet opening, a sloped portion extending from said outer end portion to a rigid connection on said sleeve near the innermost end of said sleeve for adding rigidity and stability to said sleeve with respect to said housing, means to secure said outer end portions of each of said brackets to said housing adjacent said one inlet opening, a shaft having an outer diameter less than the inner diameter of said sleeve and being journaled in said sleeve, an end portion of said shaft projecting from each end of said sleeve, a hub interconnecting said partition and the innermost end portion of said shaft so that said blower wheel rotates with said shaft, a pulley on the other end of said shaft exterior of said housing for driving said shaft, and means for effecting rotation of said pulley.

2. A blower assembly as defined in claim 1 wherein said brackets are formed from wire.

3. A blower assembly as defined in claim 1 wherein said brackets are formed from metal strips.

4. A blower assembly as defined in claim 1 wherein said brackets are formed from triangular sheet metal plates.

5. A blower assembly as defined in claim 1 wherein said one inlet has an annular venturi, said venturi being rigidly secured to said straight portion of each of said brackets so that said venturi is held in place in said one inlet opening by said brackets.

6. A blower assembly comprising, a double inlet blower wheel having a central partition therein for use in supporting the wheel, means defining an inlet in each end of said blower wheel, a housing for said blower wheel having an inlet opening aligned with each inlet of said blower wheel, an elongated relatively small diameter tubular sleeve extending axially through one of said inlet openings and through the adjacent one of said inlets of said blower wheel to a position adjacent said partition, said sleeve being supported in cantilevered manner by three wire brackets, each of said wire brackets including a straight wire portion which extends radially outward generally in the plane of said one inlet opening from a rigid connection with said sleeve to a loop on the periphery of said one inlet opening, a sloped portion extending from said loop to a rigid connection on said sleeve near the innermost end of said sleeve for adding rigidity and stability to said sleeve with respect to said housing, means to secure said loops of each of said wire brackets to said housing adjacent said one inlet opening, a shaft having an outer diameter less than the inner diameter of said sleeve and being journaled in said sleeve, an end portion of said shaft projecting from each end of said sleeve, and a hub interconnecting said partition and the innermost end portion of said shaft so that said blower wheel rotates with said shaft.

7. A blower assembly comprising, a double inlet centrifugal blower wheel having a center disk therein for use in supporting the wheel, means defining an inlet in each end of said blower wheel, a volute shaped housing for enclosing said blower wheel and having an inlet opening aligned with each inlet of said blower wheel, an elongated relatively small diameter tubular sleeve extending axially through one of said inlet openings and through the adjacent one of said inlets of said blower wheel to a position adjacent said center disk, said sleeve being supported in cantilevered manner by a plurality of spaced brackets, each of said brackets defining a triangle including a straight portion which extends radially outward generally in the plane of said one inlet opening from a rigid connection with said sleeve to an outer end portion on the periphery of said one inlet opening, a sloped portion extending from said outer end portion to a rigid connection on said sleeve near the innermost end of said sleeve for adding rigidity and stability to said sleeve with respect to said housing, means to secure said outer end portions of each of said brackets to said housing adjacent said one inlet opening, a shaft having an outer diameter less than the inner diameter of said sleeve and being journaled in said sleeve, an end portion of said shaft projecting from each end of said sleeve, a hub interconnecting said center disk and the innermost end portion of said shaft so that said blower wheel rotates with said shaft, a pulley on the other end of said shaft exterior of said housing for driving said shaft, and motor means associated with said blower housing for effecting rotation of said pulley.

8. A blower assembly comprising, a volute shaped housing, a double inlet centrifugal blower wheel having a center disk therein for use in supporting said blower wheel, means defining an inlet in each end of said blower wheel, said housing enclosing said blower wheel and having an inlet opening aligned with each inlet of said blower wheel, a small diameter tubular sleeve means having an inner end extending axially through one of said inlet openings and through the adjacent one of said inlets of said blower wheel to a position adjacent said center disk, said sleeve means being supported in cantilevered manner by a plurality of spaced brackets, each of said brackets including a straight portion which extends radially outward generally in the plane of said one inlet opening from a rigid connection with said sleeve means to an outer end adapted to be connected to said housing at the periphery of said one inlet opening, an inner portion of said brackets extending from said straight portion to a rigid connection on said sleeve means near said inner end of said sleeve means for adding rigidity and stability to said sleeve means, means to secure said outer end of each of said brackets to said housing adjacent said one inlet opening, a shaft having an outer diameter less than the inner diameter of said sleeve means and being journaled in said sleeve means, an end portion of said shaft projecting from each end of said sleeve means, hub means interconnecting said center disk and the inner end of said shaft so that said blower wheel rotates with said shaft, and drive means on the other end of said shaft exterior of said housing for rotating said shaft and said blower wheel.

References Cited

UNITED STATES PATENTS

| | | | |
|---|---|---|---|
| 847,585 | 3/1907 | Keith | 230—128 |
| 2,148,524 | 2/1939 | Bartch et al. | 230—117 |
| 2,458,045 | 1/1949 | Angus | 230—117 |
| 2,708,373 | 3/1955 | Werner | 230—117 |

DONLEY J. STOCKING, *Primary Examiner.*

HENRY F. RADUAZO, *Examiner.*